United States Patent [19]

Chen et al.

[11] Patent Number: 5,343,408
[45] Date of Patent: Aug. 30, 1994

[54] DEVICE FOR ON-LINE AUTOMATIC FLUID INJECTION BALANCING SYSTEM

[75] Inventors: Chan-Ming Chen; Jia-Ruey Wu; Chi-Maw Shieh; Wen-Pin Chang, all of Hsinchu, Taiwan

[73] Assignee: Industrial Technology Research Institute, Taiwan

[21] Appl. No.: 743,232

[22] Filed: Aug. 9, 1991

[51] Int. Cl.⁵ .................... G06F 15/46; G01M 1/20
[52] U.S. Cl. ..................... 364/508; 364/463; 73/468
[58] Field of Search .............. 364/508, 551.02, 474.06, 364/474.17, 463; 74/573 F; 51/169; 73/468, 469, 470, 659

[56] References Cited

U.S. PATENT DOCUMENTS

| | | | |
|---|---|---|---|
| 3,967,416 | 7/1976 | Birkenstock et al. | 51/169 |
| 3,996,883 | 12/1976 | Gusarov et al. | 74/573 R |
| 4,255,163 | 3/1981 | Sonderegger et al. | 51/169 |
| 4,637,171 | 1/1987 | Menigat et al. | 51/169 |
| 4,688,355 | 8/1987 | Menigat et al. | 73/468 |
| 4,905,419 | 3/1990 | Markarov et al. | 51/169 |
| 4,977,510 | 12/1990 | Winzenz et al. | 364/508 |
| 4,992,714 | 2/1991 | Matsushita et al. | 364/508 |

Primary Examiner—Thomas G. Black
Assistant Examiner—Michael Zanelli
Attorney, Agent, or Firm—Pollock, Vande Sande & Priddy

[57] ABSTRACT

Disclosed is a method and device for automatic dynamic balancing operations on machine lines so as to compensate unbalance in a rotor. Vibration signals of the rotor obtained by a transducer and revolution signals generated by a revolution detector in reaction to the rotor during rotation are fed into a band pass filter and amplifier. The processed signals are then converted into digital signals by means of a digital dynamic balancing close-loop controller. The value and location of unbalance present in the rotor are calculated by a calculating unit. Based on the unbalance value and the speed of revolution of the rotor, whether a suitable amount of fluid is needed to be injected into compensation chambers in the rotor, which is coaxial with the rotor, to eliminate the unbalance of the rotor can be determined. This balancing operation is repeated automatically until the unbalance value is less than a predetermined tolerance value.

5 Claims, 4 Drawing Sheets

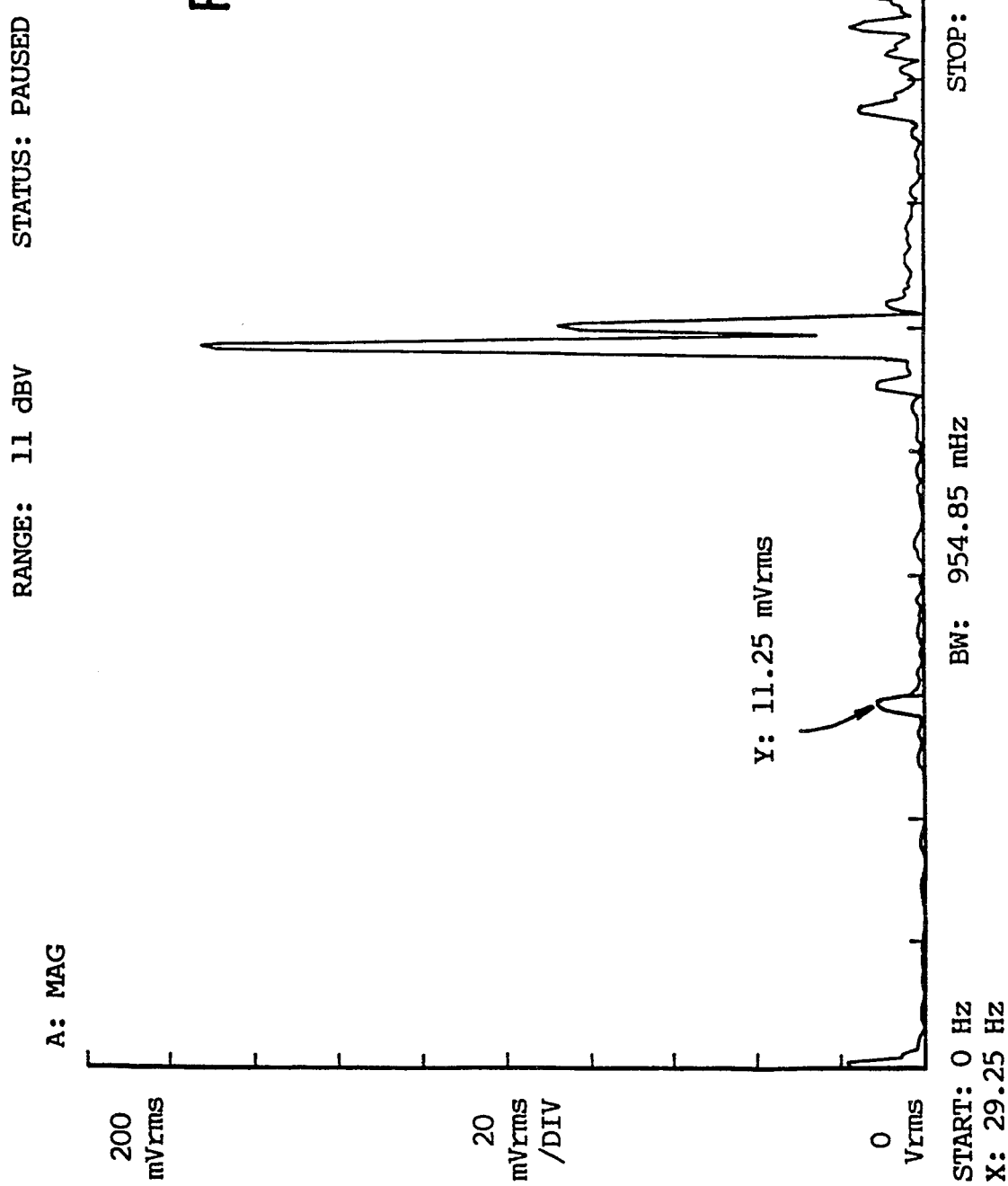

DEVICE FOR ON-LINE AUTOMATIC FLUID INJECTION BALANCING SYSTEM

BACKGROUND OF THE INVENTION

The present invention relates generally to a method and device for an on-line automatic balancing system and more particularly to a method and device for automatically and precisely balancing machine rotors during rotation.

The prior art teaches compensation of an unbalance in a rotor, but the rotor must be stopped before the balancing operation can proceed. Therefore, balancing operations have to be repeated at intervals, which is very time-consuming, and the results may not be very accurate.

Take a grinding machine for an example. When its grinding wheel is applied on a workpiece, even though the machine has previously been stopped and balanced, continuous wear on the surface of the wheel during the grinding process will cause a new unbalance and generate greater vibrations of the machine, affecting the precision of surface finish. Therefore, it is necessary to stop the machine at intervals to replace or balance the grinding wheel. This is often time-consuming and the machining process must be temporarily stopped. However, if the unbalance signal of the grinding machine is monitored at fixed intervals or at random for just a few minutes (1–3 minutes) during the grinding process so that the balancing operation is initiated when the unbalance value is measured to be greater than a predetermined tolerance value, then it is not necessary to stop the machine. Once the balancing operation is over, the grinding process can then continue. Thus, a high and stable quality of surface finish can be achieved and efficiency can also be increased. In view of this, it is indeed necessary to develop a precise automatic dynamic balancing device.

According to the inventors' research, there is only one pertinent patent in this field, that is, U.S. Pat. No. 4,688,355 issued Aug. 25, 1987, entitled "Method and Apparatus for Continuous Compensation of Grinding Wheel Unbalance." This patent teaches a device which adopts an analog signal processing method. It uses a broadband filter, a phase control rectifier to control the water output of the valve device and to measure the amount and location of unbalance. But this device has the following setbacks:

1. The transmitted signals are not clear: The vibration signals are usually caused by several vibration sources, such as unbalance, misalignment, motor, etc. By using a broadband filter for signal processing, the time domain signals are not pure enough to enable the system to judge the input unbalance signals.

2. Measurement of unbalance in grinding wheels is not precise: Because the measured analog signals contain several other vibration signals mentioned above, and the true unbalance signal cannot be separated by a broadband filter, the magnitude and location of unbalance of a rotor cannot be precisely determined by this system.

SUMMARY OF THE INVENTION

In view of the aforesaid drawbacks in prior art, it is a primary object of the present invention to provide an automatic dynamic balancing method for machine rotors such as grinding wheels. The balancing system first measures the vibration signals and revolution signals of a rotor to be balanced. It amplifies and filters the signals obtained, converts the processed signals into digital signals, and calculates the vibration magnitude, phase angle, and amount and location of unbalance of the rotor based on the digital signals. It further compares the unbalance value with a pre-determined tolerance value, so that when the unbalance value is greater than the predetermined value, a signal will be generated to initiate the automatic dynamic balancing operation.

It is another primary object of the present invention to provide a precise automatic dynamic balancing device for machine rotors, comprising a transducer for acquisition of vibration signals, a revolution detector for generating revolution signals, a band pass filter and amplifier, and a digital dynamic balancing close-loop controller, and a calculating unit.

It is another object of the present invention to provide an automatic dynamic balancing device for machine rotors for carrying out balancing operations without the need to stop the machining process.

It is yet another object of the present invention to provide an automatic dynamic balancing device for machine rotors so that precise compensation of an unbalance can be instaneously initiated when unbalance is present in rotors such as grinding wheels due to wear on the peripheral surface thereof.

It is still another object of the present invention to provide an automatic dynamic balancing device which provides clear unbalance response, convenient data storage, and longterm registration, monitoring, and transmission of vibration signals of the machine.

It is a further object of the present invention to provide an automatic dynamic balancing device for machine rotors in which the software and hardware of the control parts can be made into a single control card for easy installation and maintenance.

It is yet a further object of the present invention to provide an automatic dynamic balancing device for machine rotors, wherein the digital dynamic balancing close-loop controller has disposed therein a nozzle driver which is capable of generating continuous square waves of alternating periods to control the on-off operations of the valve to determine the amount of the compensation fluid and the magnitude of the period corresponds to the location of unbalance and the speed of revolution of the rotor. When the magnitude and location of unbalance of the rotor are determined, the unbalance can be eliminated by applying compensation fluid. If the unbalance value is less than the pre-determined tolerance value, the compensation process will terminate.

It is still a further object of the present invention to provide an automatic dynamic balancing device for machine rotors, wherein the digital dynamic balancing close-loop controller has disposed therein a counter which consists of two parts, the first part thereof being capable of evaluating the speed of rotor during rotation, and the second part thereof being capable of processing the timesequence of the operation of the injection nozzle.

The automatic dynamic balancing device to be described in further detail with reference to the accompanying drawings is understood to be an embodiment of the abovedescribed inventive method.

The present invention can be used in any machine having a rotor to perform dynamic balancing operations to grinding wheels or similar rotors. Although the following description uses grinding wheels as an example of the preferred embodiments of the invention, it should be understood that these embodiments are for illustration only and should not restrict the present invention to use with grinding wheels.

BRIEF DESCRIPTION OF THE DRAWINGS

The foregoing and other features and advantages of the present invention will be more clearly understood from the following detailed description and the accompanying drawings, in which.

FIG. 5 is a frequency spectrum of the rotor after the application of the balancing device according to the present invention.

DETAILED DESCRIPTION OF THE PREFERRED EMBODIMENTS

Figure 1:
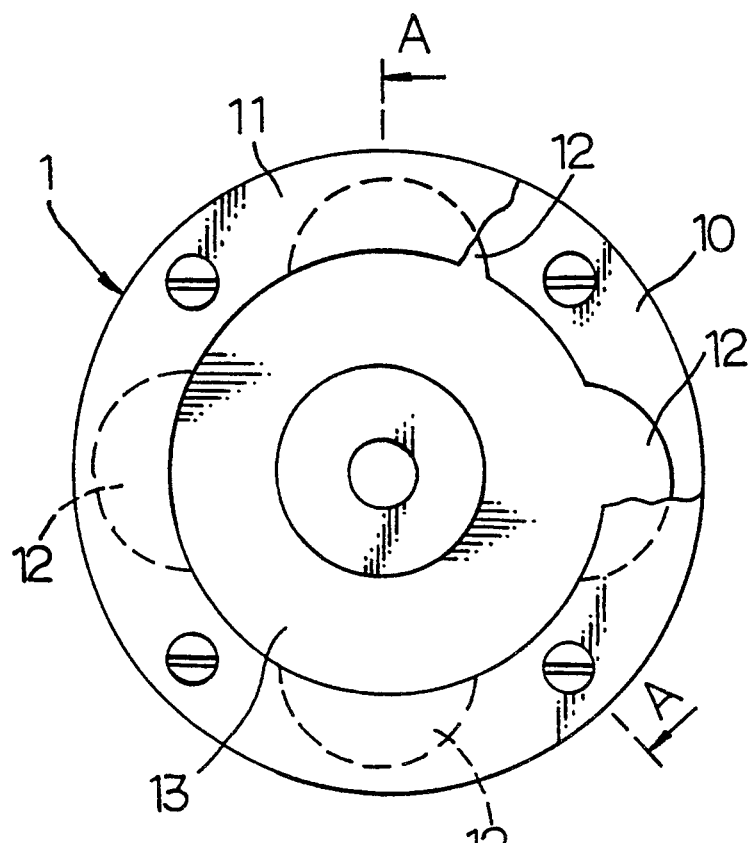
FIG. 1 is an elevational view of the embodiment of a rotor according to the present invention.
Figure 2:
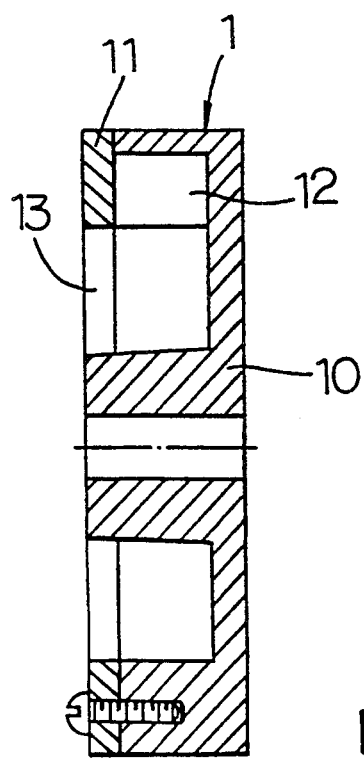
FIG. 2 is a cross-sectional view of FIG. 1 taken along line 2—2.

A compensation rotor 1 as shown in FIGS. 1 and 2 is secured onto a rotary shaft to facilitate the balancing operation of a rotor R to be balanced, such as a grinding wheel. As a general rule, it should be as close to the work domain as possible; for instance, the compensation rotor 1 should be near the rotor R to rotate therewith. As for the configuration of the compensation rotor 1, there are various embodiments; but since it is not the focus of the present invention, it is deemed unnecessary to discuss it in detail herein. The preferred embodiment of the compensation rotor 1 as shown in the figures has a body 10 with a cover 11 provided at one side thereof. When the cover 11 is in place, four correction chambers 12 are formed on the compensation rotor 1 each of which has an inlet 13. No matter how many correction chambers 12 there are, it is preferable to radially dispose them evenly on the compensation rotor 1.

Figure 3:
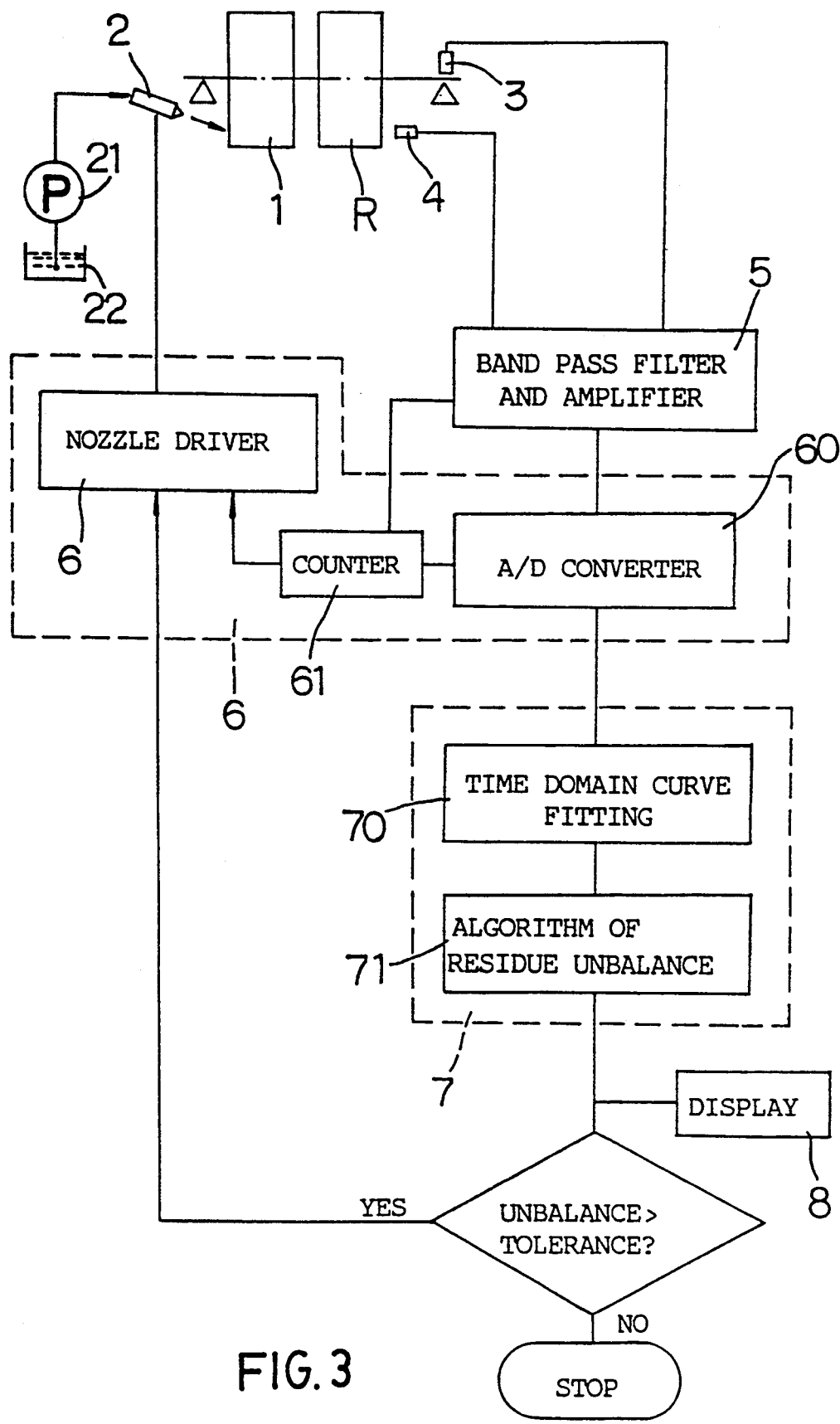
FIG. 3 is a block diagram of the balancing device according to the present invention.

With reference to FIG. 3, a rotor R secured to the rotary shaft is the object to be balanced. The balancing device according to the present invention comprises a compensation rotor 1 being coaxial with the rotor R, and an injection nozzle 2 close to the compensation rotor 1. When the balancing device according to the present invention is used on a grinding machine, then the rotor R is the grinding wheel. Adjacent to the compensation rotor 1 is the injection nozzle 2 for injecting a suitable amount of fluid such as water pumped by a pump 21 from a fluid reservoir 22 into selected chambers 12 disposed on the rotor 1. Vibration signals of the rotor R obtained by a transducer 3 and revolution signals generated by a revolution detector 4 are fed into a band pass filter and amplifier 5 for amplification and filtering to increase the signal/noise ratio. The processed signals are then forwarded to a digital dynamic balancing close-loop controller 6 to obtain digital time domain data, which are then calculated by a calculating unit 7. The result thus obtained is then transmitted back to the digital dynamic balancing close-loop controller 6 for controlling the time sequence and the amount of compensation fluid for the injection nozzle 2. All the results of measurement or calculation are shown in a display 8.

According to the configuration as described above, the block diagram of the balancing device according to the present invention is as shown in FIG. 3. Vibration signals of the rotor R measured by the transducer 3 and revolution signals generated by the revolution detector 4 are transmitted to the band pass filter and amplifier 5 for amplification, and the processed signals are then respectively fed into a counter 61 and an A/D converter 60 disposed in the digital dynamic balancing close-loop controller 6, the output signals of the counter 61 are further transmitted to the A/D converter 60 and the nozzle driver 62 respectively. The A/D converter 60 then converts the analog signals into digital signals, which are then transmitted to a time domain curve fitting 70 in the calculating unit 7 to determine the revolution frequency amplitude and phase angle of the rotor R. The results obtained by curve fitting 70 are further fed into an algorithm of residue unbalance 71 to calculate the amount and location of unbalance of the rotor R, and the result thus obtained is displayed on the display 8. Simultaneously the unbalance value is compared with a pre-determined value. If it is less than the pre-determined tolerance value, the balancing operation will terminate. On the contrary, if it is greater than the pre-determined value, a signal will be supplied to the nozzle driver 62, which controls the nozzle 2 to inject fluid from the fluid reservoir 22 into selected correction chambers 12 provided on the rotor R to initiate the balancing operation. The result of the balancing process will be further tested by the above-described procedures to determine whether the balancing operation is to be continued, until the unbalance value is less than the pre-determined value.

Figure 4:
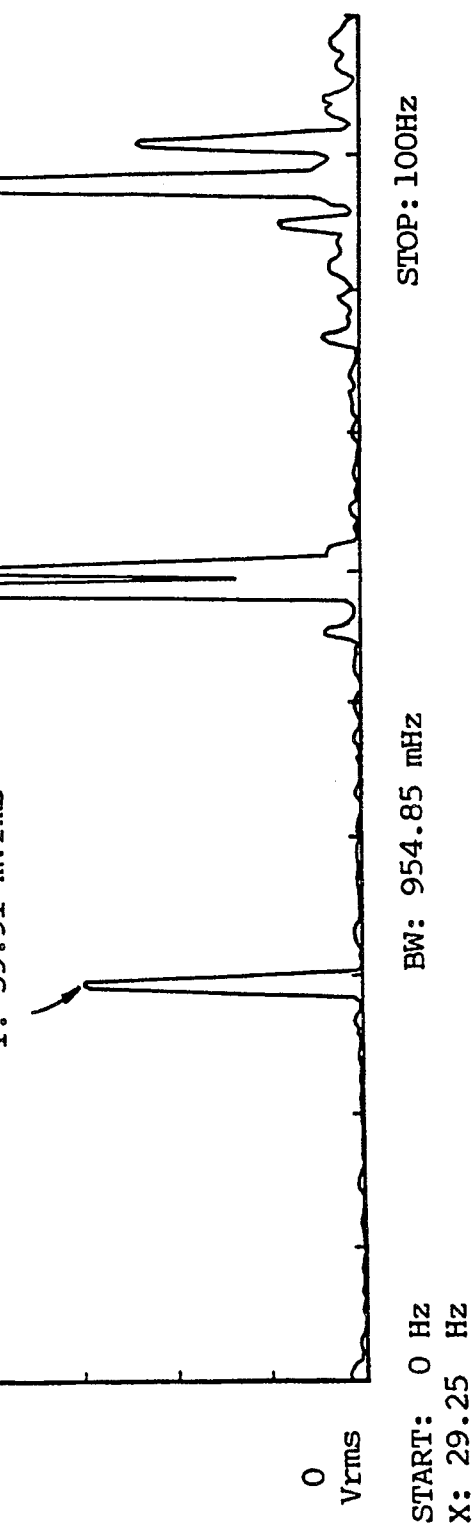
FIG. 4 is a frequency spectrum of the rotor prior to the application of the balancing device according to the present invention.

The present invention is put into practice in the preferred embodiment and the results obtained are as shown in FIGS. 4 and 5. The value of X which is based on a frequency of 29.25 Hz decreases from 59.91 mVrms in FIG. 4 to 11.25 mVrms in FIG. 5. The time needed for compensation of unbalance is only about 15 seconds; the whole balancing operation takes very little time and is very precise. Another experimental value indicates that by using the balancing device according to the present invention, the amount of unbalance can be reduced to below 0.5 g, which, when converted to ISO 1940 level, is somewhere between G0.4-G1.0.

When measuring original unbalance and influence coefficient prior to the start of the balancing operation, in order that revolution detector 4 for obtaining revolution signals has the same origin, whether it is marked onto the surface of the compensation rotor 1 or the side of the rotor R to be balanced, and that the inlet 13 in the compensation rotor 1 for receiving compensation fluid from the nozzle 2 forms a right angle with the origin, the direction of the nozzle 2 should be the same as the cutting direction of the rotor, the nozzle 2 should also form an angle of approximately 45° with the end surface of the rotor, the transducer 3 should be disposed at the side of the rotary shaft perpendicular thereto. The above-mentioned arrangement is illustrated in FIG. 3.

In view of the aforesaid, all the measurement and calculation according to the present invention are achieved by means of known hardware devices and the A/D converter 60, and the dynamic balancing operation is performed automatically, efficiently, and accurately. It is therefore a preferable device for automatic dynamic compensation of an unbalance in a rotor.

Although the present invention has been illustrated and described with reference to the preferred embodi-

What is claimed is:

1. An automatic dynamic balancing device for balancing a rotary shaft and rotor comprising:
   a compensation rotor having correction chambers secured to said rotary shaft;
   an injection nozzle adjacent said compensation rotor for injecting a fluid into said compensation rotor correction chambers;
   a transducer for detecting vibrations of said rotary shaft;
   a revolution detector for generating signals representing revolutions of said rotary shaft;
   a bandpass filter and amplifier connected to receive signals from said transducer and revolution detector;
   a digital dynamic balancing close-loop controller for generating digital time domain data for controlling the amount of flow and duration of fluid flow from said injection nozzle; and,
   a calculating unit including a time domain curve fitting and algorithm residue of unbalance for calculating an amount and location of rotor unbalance, and for generating from signals received from said bandpass filter and amplifier an input signal for said digital dynamic close-loop controller for controlling said injection nozzle to inject an appropriate amount of fluid into said correction chambers arranged on said compensation rotor to compensate and eliminate the unbalance present in said rotary shaft and said rotor provided thereon.

2. An automatic dynamic balancing device used on machine lines as claimed in claim 1, wherien said digital dynamic balancing close-loop controller include an A/D converter, a counter, and a nozzle driver.

3. An automatic dynamic balancing device as claimed in claim 2, wherein said counter evaluates the speed of revolution of said rotor during rotation and time-sequence of said injection nozzle.

4. An automatic dynamic balancing device as claimed in claim 2, wherein said nozzle driver controls a valve of said injection nozzle.

5. An automatic dynamic balancing device as claimed in claim 1, wherein said time domain curve fitting is used to find the rotor revolution frequency amplitude, and phase angle.

* * * * *